United States Patent
Taber et al.

[11] Patent Number: 6,079,320
[45] Date of Patent: *Jun. 27, 2000

[54] BROILER ASSEMBLY

[75] Inventors: Bruce E. Taber, Bothell; Bradley Allen, Redmond, both of Wash.

[73] Assignee: Lang Manufacturing Company, Everett, Wash.

[*] Notice: This patent is subject to a terminal disclaimer.

[21] Appl. No.: 08/948,618

[22] Filed: Oct. 10, 1997

Related U.S. Application Data

[63] Continuation-in-part of application No. 08/712,583, Sep. 13, 1996, Pat. No. 5,676,046.

[51] Int. Cl.$^7$ .................................................. A47J 37/06
[52] U.S. Cl. .............................. 99/340; 99/349; 99/379; 99/385; 99/401
[58] Field of Search .............................. 99/328–335, 339, 99/340, 349, 357, 375–379, 372, 353–355, 385–401, 425, 426, 447; 100/266, 93.1; 126/41 R, 39 G; 219/524, 521; 426/233, 523

[56] References Cited

U.S. PATENT DOCUMENTS

| | | | |
|---|---|---|---|
| 3,735,749 | 5/1973 | Binks et al. | 126/20 |
| 3,746,837 | 7/1973 | Frey et al. | 219/387 |
| 4,092,915 | 6/1978 | Keeny | 100/93 |
| 4,150,609 | 4/1979 | McClean | 99/372 |
| 4,165,682 | 8/1979 | Weiss | 99/331 |
| 4,170,933 | 10/1979 | Meamber | 99/349 |
| 4,217,817 | 8/1980 | Meamber | 99/349 |
| 4,241,650 | 12/1980 | John et al. | 99/372 |
| 4,483,239 | 11/1984 | Mueller et al. | 99/340 |
| 4,503,759 | 3/1985 | Haas, Sr. et al. | 99/380 |
| 4,586,428 | 5/1986 | Adamsen | 99/332 |
| 4,601,237 | 7/1986 | Harter et al. | 99/379 X |
| 4,612,081 | 9/1986 | Kasper et al. | 156/583.1 |
| 4,635,538 | 1/1987 | Polster | 99/349 |
| 4,669,373 | 6/1987 | Weimer et al. | 99/349 |
| 4,697,504 | 10/1987 | Keating | 99/331 |

(List continued on next page.)

FOREIGN PATENT DOCUMENTS

| 756826 | 6/1933 | France . |
|---|---|---|
| 1370743 | 7/1963 | France . |

OTHER PUBLICATIONS

Lang—Quartz Combo Boil'n Grill Pamphlet, undated.
Vulcan—Top Side Griddle Heavy Duty Gas Lower Griddle with Top Side, Swing Down Electric Griddle Models: 936, 948, and 960 Pamphlet, undated.
Lang—Quartz Combo Pamphlet, undated.
Wolf—Gas Two-Sided Cooker Pamphlet, undated.

*Primary Examiner*—Timothy Simone
*Attorney, Agent, or Firm*—Seed and Berry LLP

[57] ABSTRACT

A broiler assembly connectable to a cooking apparatus and provided with a broiler surface that generates a substantially even heat distribution pattern for cooking. The broiler assembly has a broiler housing defining a broiler interior area. Plenum members defining a plenum in the broiler interior area, wherein the plenum is connectable to a gas source and adapted to receive combustion gas from the gas source. A lower one of the plenum members is a burner tile holder that retains one or more burner tiles that define a broiler surface. The burner tiles have a plurality of burner apertures therein that communicate with the plenum to channel the combustion gas from the plenum to the broiler surface for ignition. The burner tiles form a burner portion having an outer set of burner apertures extending therethrough, an inner set of burner apertures extending therethrough, and a middle set of burner apertures between the outer and inner sets of burner apertures. Outer spacer portions having no apertures therein are positioned between the outer and middle sets of burner apertures, and inner spacer portions having no apertures therein are positioned between the middle and inner sets of burner apertures. Ignition pathways extend between the outer and middle sets of burner apertures and also between the middle and inner sets of burner apertures. The sets of burner apertures and the spacer portions provide a substantially non-uniform heat source distributed at a selected distance spaced apart from the broiler surface while providing a substantially uniform heat distribution pattern over the broiler surface during operation of the broiler assembly.

15 Claims, 11 Drawing Sheets

U.S. PATENT DOCUMENTS

| | | | |
|---|---|---|---|
| 4,700,619 | 10/1987 | Scanlon | 99/349 |
| 4,729,296 | 3/1988 | Sabin | 99/349 |
| 4,763,571 | 8/1988 | Bergling et al. | 99/349 |
| 4,878,424 | 11/1989 | Adamson | 126/39 G |
| 4,913,040 | 4/1990 | Sherman et al. | 99/372 |
| 4,987,827 | 1/1991 | Marquez | 99/425 X |
| 5,197,377 | 3/1993 | Jennings et al. | 99/349 |
| 5,247,874 | 9/1993 | George, II et al. | 99/353 X |
| 5,287,919 | 2/1994 | George, II et al. | 165/170 |
| 5,341,727 | 8/1994 | Dickson | 100/93 P |
| 5,531,155 | 7/1996 | Pellicane et al. | 99/372 X |
| 5,555,794 | 9/1996 | Templeton et al. | 99/349 |
| 5,676,046 | 10/1997 | Taber et al. | 99/340 |
| 5,771,782 | 6/1998 | Taber et al. | 99/340 |

BROILER ASSEMBLY

CROSS-REFERENCE TO RELATED APPLICATION

This application is a continuation-in-part of U.S. application Ser. No. 08/712,583, filed Sep. 13, 1996 now U.S. Pat. No. 5,676,046.

TECHNICAL FIELD

The present invention relates generally to cooking devices, and more particularly, to gas broiler assemblies.

BACKGROUND OF THE INVENTION

Griddles and charbroilers that provide single-side cooking have been used for high volume food production because of their speed and volume in cooking. However, such single-side cooking devices cook only one side of the food at a time, so food must be turned by an attendant or an automated machine. To increase speed and efficiency of high volume cooking, double-sided cooking devices are used. The conventional double-sided cooking devices include a lower cooking surface that faces upwardly and on which food to be cooked is placed, and a top cooking surface that faces downwardly over the lower cooking surface to simultaneously cook both sides of the food. While the conventional double-sided cooking devices are substantially faster and more efficient than the single-sided cooking devices, many single-sided cooking devices exist and are in daily use.

To achieve some of the benefits of the double-sided cooking devices, single-sided cooking devices such as griddles have been fitted with removable, top-side contact cookers that have an upper griddle surface which is pressed against the food's top side. As an example, U.S. Pat. No. 4,483,239 and U.S. Pat. No. 4,165,682 disclose electrical top-side contact cookers that are mounted directly to a rear splash guard of a single-sided cooking griddle. Mounting the top-side contact cooker on the rear splash guard causes stresses that the rear splash guard was not designed to handle, so the size and weight of these removable top-side contact cookers are limited. As a result, the size of the cooking surface and the efficiency of the cooking provided by such removable top-side contact cookers is limited.

The conventional single-sided and double-sided cooking devices generate high temperature exhaust that is directed toward the back of the cooking device so as to avoid high temperatures at the front side where attendants typically stand. The exhaust is typically drawn rearwardly and upwardly away from the cooking device by a separate ventilating system positioned above the cooking device, which results in high temperatures behind the cooking device. As a result of these high temperatures, safety regulations require that cooking devices be spaced apart from a wall and other structures to avoid creating a fire hazard. However, the space behind the cooking devices is difficult to maintain in a clean and sanitary manner, and uses up valuable kitchen floor space. In addition, the mountable top-side contact cookers, such as those disclosed in U.S. Pat. Nos. 4,483,239 and 4,165,682, generate additional heat that must be considered when determining the necessary space behind the modified single-sided cooking device to ensure that a fire hazard is not created.

Conventional broilers also have heating elements, such as flames or electrical elements, that are mounted to a holder in a substantially uniform pattern in an attempt to provide uniform heating under the broiler. Conventional gas broilers have evenly distributed burner tiles through which gas flows and is ignited to generate the broiling heat. However, the evenly distributed heating elements and burner tiles do not provide an even heating pattern. The heat radiating elements or surfaces produce diminishing radiation from the center outward, which is well known as the shape factor in radiation heat transfer. Accordingly, the uneven heating pattern of the conventional broilers cause inefficient and uneven cooking.

A conventional double-sided cooking device having a permanent top-side gas broiler is adapted to provide gas and combustion air to the top-side broiler for generation of the broiler flames. The top-side broiler is pivotal relative to the lower cooking surface between raised and lowered positions, and a gas line is provided with a sealed swivel joint at a pivot area along the gas line. The sealed swivel joint allows the broiler to pivot while also allowing for a continuous gas flow to the broiler surface when the broiler is in the lower position so that the broiler flames can be accurately controlled. However, the swivel joint in the gas line causes a significant gas flow restriction and a relatively large pressure drop along the gas line. The large pressure drop in the gas line makes the top-side broiler more sensitive to gas pressure changes, thereby effecting the controllability and accuracy of broiler heat. Accordingly, such conventional double-sided cooking devices must be manufactured with great accuracy to ensure the top-side gas broilers will provide accurate and efficient broiling.

Additional factors that require accurate manufacturing of double-sided cooking devices with top-side broilers include the need to place electrical components in areas that will not be heated to unacceptably high levels, the need to control high temperature exhaust, and the need to provide combustion air in a controlled manner to ensure a proper gas and air mixture before the mixture is ignited to form the broiler flames. All of these factors and more have previously made add-on top-side broilers that are mountable to single-sided cookers undesirable. Some of these same problems are suffered by original equipment double-sided cooking devices.

SUMMARY OF THE INVENTION

The present invention is directed toward a broiler assembly having one or more heating portions that are spaced apart to define a substantially non-uniform heat source to provide a substantially even heating pattern so as to overcome the drawbacks experienced with prior art broilers. In an exemplary embodiment of the invention, the broiler assembly comprises a broiler housing defining a broiler interior area and plenum members defining a plenum in the broiler interior area. The plenum is connectable to a gas source and is adapted to receive combustion gas from the gas source. A burner portion is connected to one of the plenum members to define a burner surface. The burner portion has a plurality of burner apertures therein that communicate with the plenum to channel the combustion gas from the plenum to the burner surface for ignition. The burner portion has first and second sets of burner apertures spaced apart from each other by a selected distance to define a substantially non-uniform heat source across the burner surface, with the first and second sets of burner apertures being positioned relative to each other to provide a substantially uniformly distributed heat pattern from the burner surface upon ignition of the combustion gas.

In one exemplary embodiment, the burner portion has an inner portion with an inner set of burner apertures extending therethrough and an outer portion with an outer set of burner apertures extending therethrough. The outer portion is substantially concentrically disposed about the inner portion. The inner and outer portions are separated by an intermediate portion of the burner portion that extends around the inner portion so as to define enlarged spaces having no apertures therein between the inner and outer portions to define the substantially non-uniform heat source. The inner and outer portions are positioned to provide substantially even heat distribution pattern over the broiling surface upon ignition of the combustion gas flowing through the burner apertures.

In the one exemplary embodiment, the burner portion includes four square burner tiles positioned to define a substantially square burner surface. Each burner tile has an L-shaped inner portion, an L-shaped outer portion, and an L-shaped intermediate portion. The four burner tiles are positioned so the L-shaped outer portions are interconnected to define a substantially square pattern of burner apertures that extend around the perimeter area of the broiler surface. The L-shaped inner portions are interconnected to define a substantially square pattern of burner apertures that are within the outer portions and that extend around a central portion of the burner surface having no apertures therein. The L-shaped intermediate portions are also interconnected to define a generally square configuration positioned between the inner and outer portions so as to separate them by an area having no apertures therethrough. Accordingly, the combustion gas is not provided in that intermediate portion during operation of the broiler assembly, thereby providing the substantially non-uniform heat source while achieving the substantially uniform heat distribution pattern over the burner surface.

The broiler assembly of the exemplary embodiment includes a tile holder that defines a lower one of the plenum members. The title holder includes a gas distributor plate with a plurality of apertures therein to direct the combustion gas from the plenum toward the burner tiles. The gas distributor plate is spaced apart from the burner tiles by a plurality of bridge members that interconnect the burner tiles to the gas distributor plate.

DETAILED DESCRIPTION OF THE INVENTION

Figure 1:
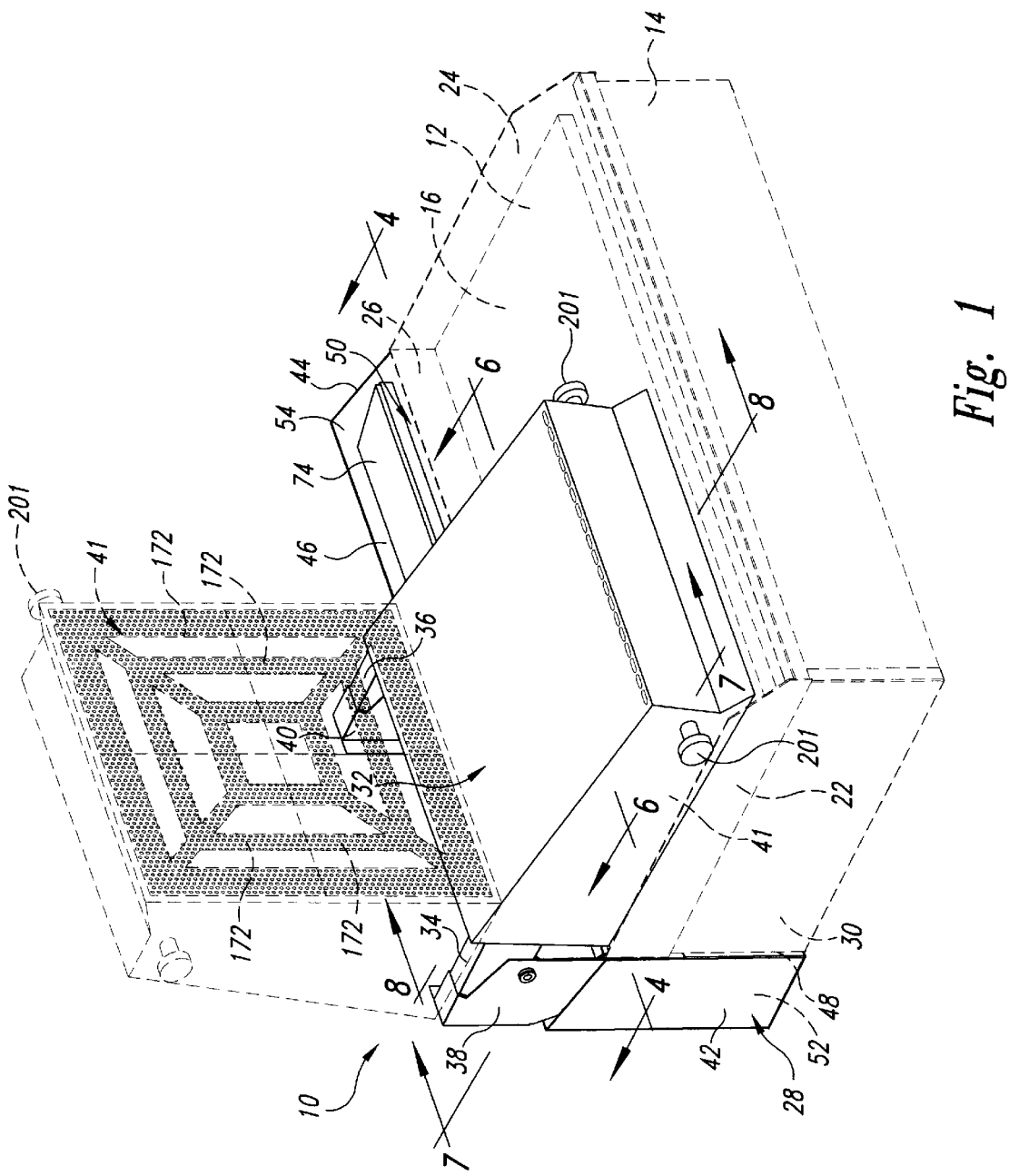
FIG. 1 is a top isometric view of a broiler assembly in accordance with an exemplary embodiment of the present invention, with the assembly being shown mounted on a conventional single-sided griddle, illustrated in phantom lines, with a broiler being shown in solid lines in a lowered cooking position and in phantom lines in a raised, open position.

A broiler assembly 10 in accordance with an exemplary embodiment of the present invention is shown in the drawings for illustrative purposes. As best seen in FIG. 1, the illustrated broiler assembly 10 is a conversion broiler assembly that is mountable to a conventional single-sided griddle 12, shown in phantom lines, to convert the single-sided griddle to a double-sided cooking device. The griddle 12 has a frame 14 that supports an upwardly facing cooking surface 16, and a left splash guard 22, a right splash guard 24, and a rear splash guard 26 at a rear side 30 of the griddle. These splash guards extend around three edges of the cooking surface to contain debris or material that may be generated while cooking on the griddle. For purposes of clarity of this specification, left and right references are taken from a perspective when viewing the griddle 12 from the front looking rearward. While the broiler assembly 10 is discussed herein as being connectable to a griddle 12, it is to be understood that the broiler assembly is connectable to other cooking devices, electric or non-electric, such as a char-broiler or the like.

The broiler assembly 10 is mountable to the rear side 30 of the griddle 12, and the assembly has a rear housing 28 that is adapted to be securely fastened on the griddle rearward of the rear splash guard 26. The broiler assembly 10 includes a left stanchion 38 and a right stanchion 40 that are laterally spaced apart from each other and are partially contained in the rear housing 28. The left and right stanchions 38 and 40 are structural support members extending substantially vertically out of an open top side 54 of the rear housing 28. A left support arm 34 and a right support arm 36 are pivotally connected to the left stanchion 38 and right stanchion 40, respectively, and a broiler 32 is securely mounted to the left and right support arms at a position above the cooking surface 16 of the griddle 12.

The left and right support arms 34 and 36 and the broiler 32 are pivotally movable as a unit relative to the left and right stanchions 38 and 40 between a lowered, cooking position, illustrated in solid lines in FIG. 1, and a raised, open position, shown in phantom lines in FIG. 1. In the lowered, cooking position, the left and right support arms 34 and 36 are substantially perpendicular to the left and right stanchions 38 and 40. The broiler 32 is supported between the left and right support arms 34 and 36 over the cooking surface 16 of the griddle 12, such that a broiler surface 41, shown in phantom lines in FIG. 1, is a selected distance above the griddle's cooking surface. When the broiler 32 is in the raised, open position, the left and right support arms 34 and 36 extend upwardly and are in substantial vertical alignment with the left and right stanchions 38 and 40. Accordingly, the broiler surface 41 is exposed and generally faces forwardly.

In the exemplary embodiment, a conventional counterbalance mechanism, such as a spring or the like, is interconnected between one of the left and right support arms 34 and 36 and the respective left and right stanchion 38 and 40 to allow the broiler 32 to be easily and smoothly lifted to the raised, open position and closed to the lowered, cooking position.

The left and right stanchions 38 and 40 are laterally movable relative to the rear housing 28 and relative to the cooking surface 16, such that the left and right stanchions, the left and right support arms 34 and 36, and the broiler 32 are laterally movable as a unit between a left position, shown in solid lines in FIG. 1, and a right position (not shown) to the right thereof but still over the cooking surface. In the left position, the left side of the broiler 32 is adjacent to the left splash guard 22, and in the right position, the right side of the broiler is adjacent to the right splash guard 24. Accordingly, the broiler 32 can be laterally positioned by the user to a desired position over the cooking surface 16 when the broiler assembly 10 is mounted to the griddle 12.

Figure 2:
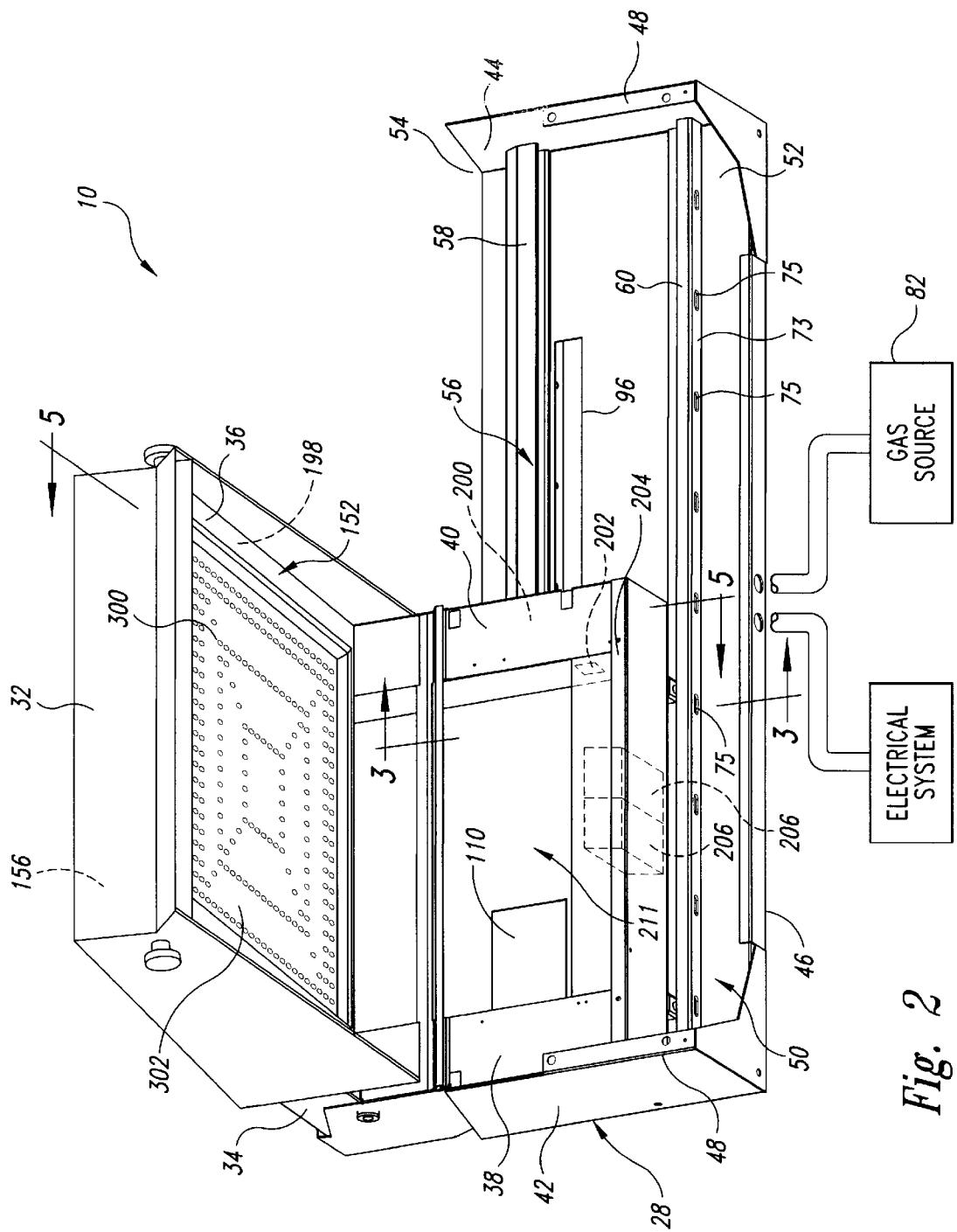
FIG. 2 is an enlarged bottom isometric view of the broiler assembly of FIG. 1 shown removed from the griddle.

As best seen in FIGS. 1 and 2, the rear housing 28 has a left sidewall 42, a right sidewall 44, and a rear wall 46 extending therebetween. When the rear housing 28 is mounted to the griddle 12 (FIG. 1), the rear wall 46 is spaced apart from and rearward of the rear side 30 of the griddle. The left and right sidewalls 42 and 44 have inwardly extending mounting flanges 48 that are adapted to be securely fastened to the rear side 30 of the griddle 12 (FIG. 1) with threaded fasteners (not shown) to securely retain the broiler assembly 10 on the griddle. The mounting flanges 48 are shaped and sized to allow the broiler assembly 10 to be easily mounted to the rear side 30 of virtually any commercial griddle, charbroiler, or other similar cooking device.

The left and right sidewalls 42 and 44 and the rear wall 46 of the rear housing 28 are integrally connected such that, when mounted at the rear side 30 of the griddle 12, a housing interior area 50 is defined having an open bottom side 52 and the open top side 54. The open bottom and top sides 52 and 54 allow wash air to pass upwardly through the housing interior area 50 by natural convection during operation of the broiler 32 and the griddle 12. The open top side 54 also allows exhaust air and gas generated during operation of the broiler 32 and the griddle 12 to exit the housing interior area 50, as discussed in greater detail below.

Figure 3:
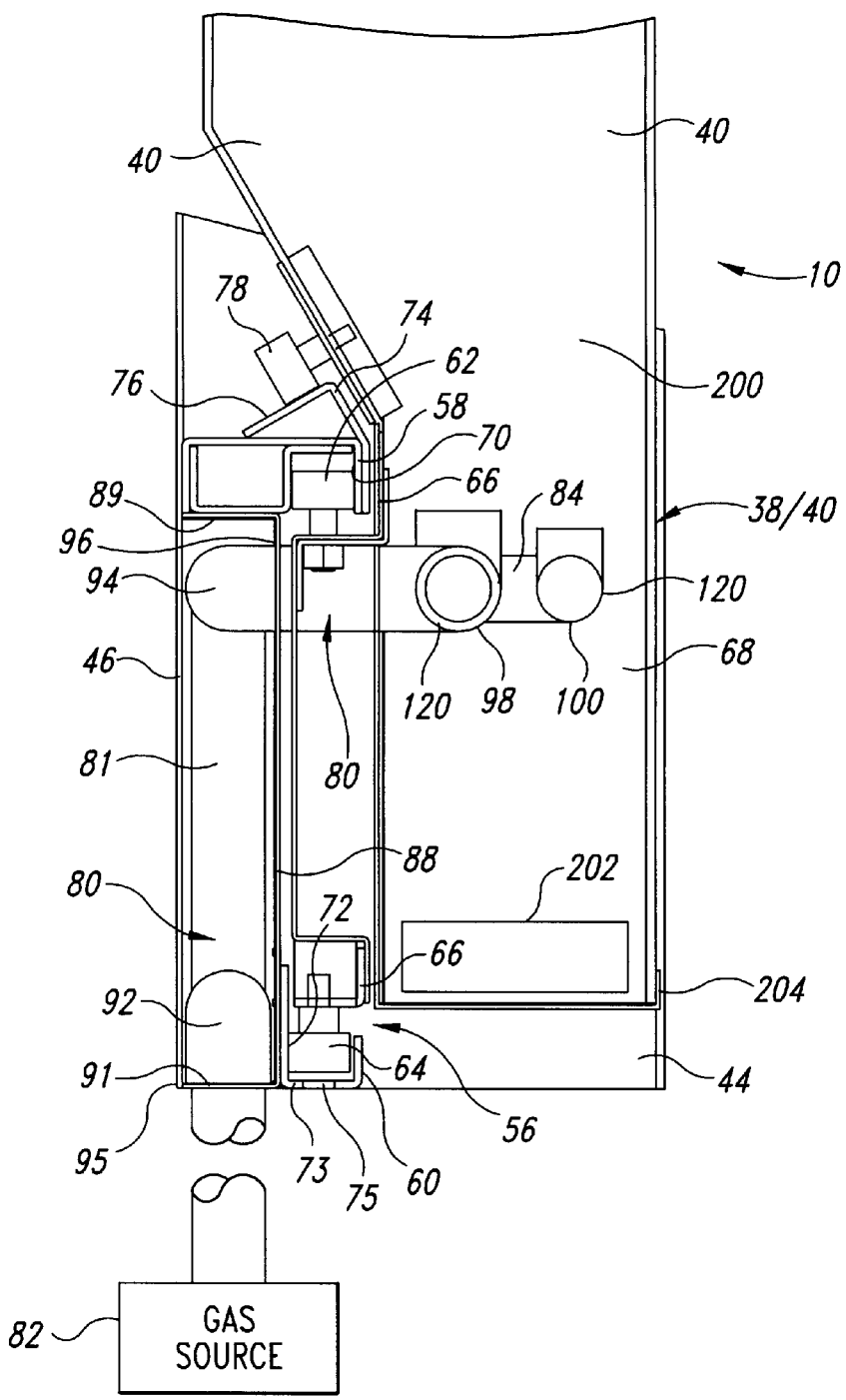
FIG. 3 is an enlarged cross-sectional left side view taken substantially along line 3—3 of FIG. 2 illustrating the structure contained within a rear housing.

As best seen in FIG. 2, the left and right stanchions 38 and 40 are movably mounted to a rail system 56 that is attached to the rear wall 46 of the rear housing 28. The rail system 56 allows the left and right stanchions 38 and 40 to translate laterally between the left sidewall 42 and the right sidewall 44 of the rear housing 28. Each of the left and right stanchions 38 and 40 have rollers (not shown in FIG. 2) that travel along the rail system 56, as will be described below with respect to FIG. 3. The left and right stanchions 38 and 40 have the same roller configuration, so only the right stanchion is illustrated in FIG. 3 and will be discussed. The discussion is equally applicable to the left stanchion.

As best seen in FIG. 3, the right stanchion 40 has an upper roller 62 and a lower roller 64, both positioned in a vertical plane and oriented in vertical alignment having their axes of rotation aligned in the vertical plane. The upper and lower rollers 62 and 64 are mounted with contoured bracketry 66 to a lower portion 68 of the stanchion. The rail system 56 has a horizontal upper rail 58 and a horizontal lower rail 60 that are substantially parallel and extend along the length of the rear housing 28. The upper rail 58 has an inverted, downwardly open, generally U-shaped cross-sectional shape that receives the upper roller 62 therein. The upper roller 62 rolls along a forward vertical running surface 70 of the upper rail 58. The lower rail 60 has an upwardly open, generally U-shaped cross-sectional shape that receives the lower roller 64 therein. The lower roller 64 rolls along a rear vertical running surface 72 of the lower rail 60.

As best seen in FIGS. 2 and 3, the lower rail 60 of the exemplary embodiment has a horizontal bottom wall 73 below the rear vertical running surface 72, and the bottom wall 73 has a plurality of slots 75 extending therethrough. The slots 75 are sized so debris which has fallen into the lower rail 60 can pass through the lower rail's bottom wall 73, thereby keeping the lower rail clear of debris that could interfere with the lower roller 64.

The upper and lower rollers 62 and 64 engage only the vertical running surfaces 70 and 72, respectively to keep the left and right stanchions 38 and 40 vertically oriented and to support the left and right stanchions against bending moments caused by the weight of the broiler 32 and the left and right support arms 34 and 36. The upper and lower rollers 62 and 64 do not vertically support the left and right stanchions 38 and 40 to maintain the vertical position of the stanchions relative to the rear housing 28. This is achieved by a top inclined rail 74 that supports the left and right stanchions 38 and 40. As best seen in FIG. 3, the top inclined rail 74 has an angled, generally L-shaped cross-section. The top inclined rail 74 is securely positioned above the upper rail 58 such that the top inclined rail has an inclined running surface 76 that slopes rearwardly and downwardly toward the rear wall 46 of the rear housing 28.

The right stanchion 40 has a top inclined roller 78 mounted to the lower portion 68 of the stanchion at a position above the upper roller 62 so as to rollably engage the inclined running surface 76. The top inclined roller 78 rolls along the inclined running surface 76 and vertically supports the right stanchion 40 at a selected vertical position relative to the rear housing 28. As a result, the upper and lower rollers 62 and 64 are also vertically supported by the top inclined roller 78 in proper position to rollably engage the upper and lower rails 58 and 60.

The bending moments caused by the weight of the broiler 32 and the left and right support arms 34 and 36 hold the upper roller 62 in firm engagement with the forward vertical running surface 70 of the upper rail 58 and the lower roller 64 in firm engagement with the rear vertical running surface 72 of the lower rail 60. The top inclined rail 74 and the top inclined roller 78 are positioned at an angle so as to minimize the horizontal reaction loads on the upper and lower rollers 62 and 64. This minimizing of the horizontal reaction loads also minimizes the rolling resistance between the upper and lower rollers 62 and 64 and their respective forward and rear vertical running surfaces 70 and 72. As a result, the top inclined roller 78 and the upper and lower rollers 62 and 64 travel smoothly along the top inclined rail 74 and the upper and lower rails 58 and 60, respectively.

In an alternate embodiment, the left and right stanchions 38 and 40 are fixedly mounted to the rear housing 28 so they are not movable laterally relative to the rear housing. This alternate embodiment does not have the rail system 56 and the left and right stanchions 38 and 40 do not include the upper, lower, and top inclined rollers 62, 64, and 78, respectively.

Figure 4:
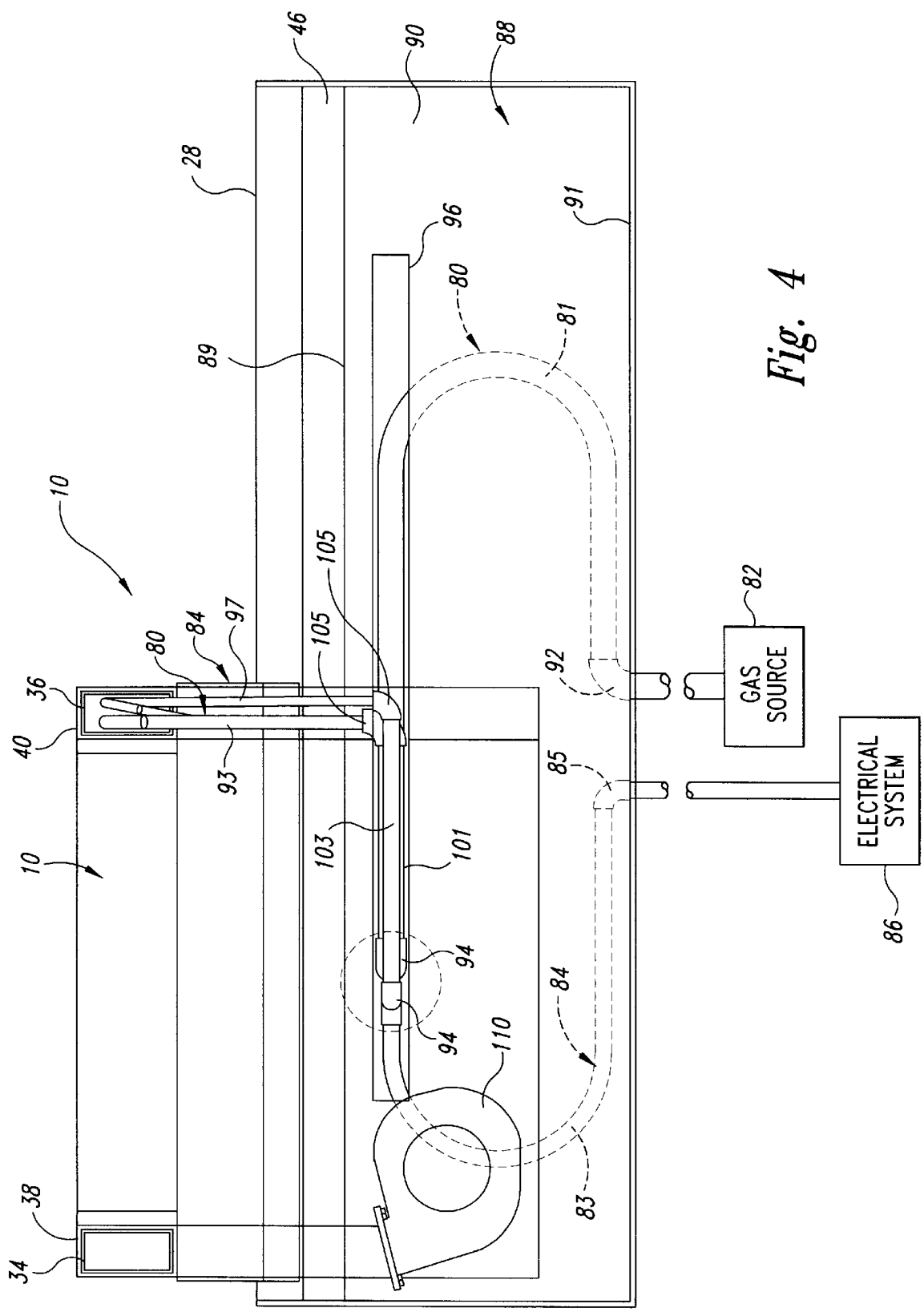
FIG. 4 is an enlarged cross-sectional front view taken substantially along line 4—4 of FIG. 1 illustrating a hose-and-conduit housing portion of the rear housing, with a gas hose portion and an electrical conduit portion shown in broken lines without a rail system being shown for purposes of clarity.

In the exemplary embodiment, the broiler 32 is a gas broiler that uses natural gas, propane gas, or any suitable mixture of combustible gas to generate broiling heat at the broiler surface 41. As best seen in FIGS. 3 and 4, the broiler assembly 10 includes a gas line 80 that provides a selected flow of gas from a conventional gas source 82 to the broiler 32. The broiler assembly 10 also has an electrical line 84 that provides electricity to the assembly from a conventional electrical system 86. The gas line 80 and the electrical line 84 are partially contained in a hose-and-conduit housing 88 that is securely mounted to the rear wall 46 of the rear housing 28. The hose-and-conduit housing 88 is an elongated, open sided box structure having opposing top and bottom sidewalls 89 and 91 attached to the rear wall 46 of the rear housing 28, and a forward wall 90 spaced apart from and forward of the rear wall and extending between the top and bottom sidewalls.

As best shown in FIG. 4, the hose-and-conduit housing 88 contains a flexible, lower hose portion 81 of the gas line 80 that is connected to a lower elbow fitting 92 extending through the bottom sidewall 91. The lower elbow fitting 92 is connectable to the gas source 82. The hose-and-conduit housing 88 also contains a flexible lower conduit portion 83 of the electrical line 84 having electrical wire therein. The lower conduit portion is connected to a lower electrical fitting 85 that extends through the bottom sidewall 91 and connects to the electrical system 86. The lower hose portion 81 and the lower conduit portion 83 are arranged in a vertical plane trapped between the rear wall 46 of the rear housing 28 and the forward wall 90 of the hose-and-conduit housing 88 to maintain this arrangement. The lower hose portion 81 and the lower conduit portion 83 extend horizontally above the bottom sidewall 91 away from the respective fitting 92 and 85 to which they are attached and away from each other, then curve upwardly toward the top sidewall 89, turn back toward each other near the top sidewall 89, and terminate at respective upper line connectors 94 located adjacent to each other. The upper line connectors 94 are positioned between the left and right stanchions 38 and 40. Accordingly, the lower hose portion 81 and lower conduit portion 83 bend or bow away from each other and together define an oval-shaped configuration within the hose-and-conduit housing 88.

The lower hose portion 81 and the lower conduit portion 83 each have a sufficient stiffness so as to bend in a radius that does not exceed a selected minimum bend radius as the left and right stanchions 38 and 40 are moved laterally with the broiler 32 as described above. The minimum bend radius of each of the lower hose portion 81 and the lower conduit portion 83 is the selected bending limit whereat the lower hose portion and lower conduit portion do not bend beyond their elastic limit. By not bending the lower hose portion 81 and the lower conduit portion 83 past the minimum bend radius, fatigue in the lower hose and conduit portions is minimized and a desired gas flow through the gas line 80 can be maintained. Therefore, the lower hose portion 81 and the lower conduit portion 83 are sufficiently stiff to maintain the generally elongated oval configuration within the hose-and-conduit housing 88.

In the exemplary embodiment, the distance between the forward wall 90 of the hose-and-conduit housing 88 and the rear wall 46 of the rear housing 28 is slightly greater than the diameter of the lower hose portion 81. Accordingly, forward and rearward movement of the lower hose portion 81 and the lower conduit portion 83 is minimized. The limited distance between the forward wall 90 and the rear wall 46 prevents twisting and possible kinking of the lower hose portion 81 and lower conduit portion 83 during lateral movement of the left and right stanchions 38 and 40.

As best seen in FIG. 4, the forward wall 90 of the hose-and-conduit housing 88 has an elongated slot 96 therein that extends between left and right side portions of the forward wall 90. Each of the upper line connectors 94 extends forwardly through the elongated slot 96 away from the forward wall of the hose-and-conduit housing 88 and interconnect the lower hose portion 81 to a rigid horizontal gas line portion 101 and the lower conduit portion 83 to a rigid horizontal electrical conduit portion 103. The rigid gas line portion 101 and the rigid electrical conduit portion 103 extend away from the upper line connectors 94 and are securely connected to the right stanchion 40.

When the left and right stanchions 38 and 40 are laterally moved relative to the rear housing 28, the rigid gas line portion 101, the rigid electrical conduit portion 103, and the upper line connectors 94 also move laterally, such that the upper line connectors travel along the length of the elongated slot 96. As the upper line connectors 94 move laterally, the flexible lower hose portion 81 and the flexible lower conduit portion 83 are pulled or pushed laterally within the hose-and-conduit housing 88 while the lower fittings 92 and 85 remain stationary. Accordingly, the lower hose portion 81 and lower conduit portion 83 move in a motion within the hose-and-conduit housing 88 that generally corresponds to rotational movement of a tractor tread. Each of the lower hose portion 81 and the lower conduit portion 83 have a length that is sufficient to allow the left and right stanchions 38 and 40 to be moved unrestricted fully between the left and right sides of the rear housing 28 without the lower hose portion or the lower conduit portion bending in a radius that is less than the minimum bend radius.

The gas line 80 and the electrical line 84 each include a pass-through fitting 105 that connects a respective one of the horizontal, rigid gas line portion 101 and the rigid electrical conduit portion 103 to a flexible upper gas hose portion 93 or a flexible upper electrical conduit portion 97 which extends through an upper portion of the right stanchion 40. As discussed in greater detail below, the right stanchion 40, the left stanchion 38, the right support arm 36, and the left support arm 34, are substantially hollow members defining combustion air and cooling passageways therethrough that communicate with the broiler 32. The hollow right stanchion 40 and the hollow right support arm 36 also provide an interior raceway for the gas and electrical lines 80 and 84 so as to provide their access to the broiler.

Figure 5:
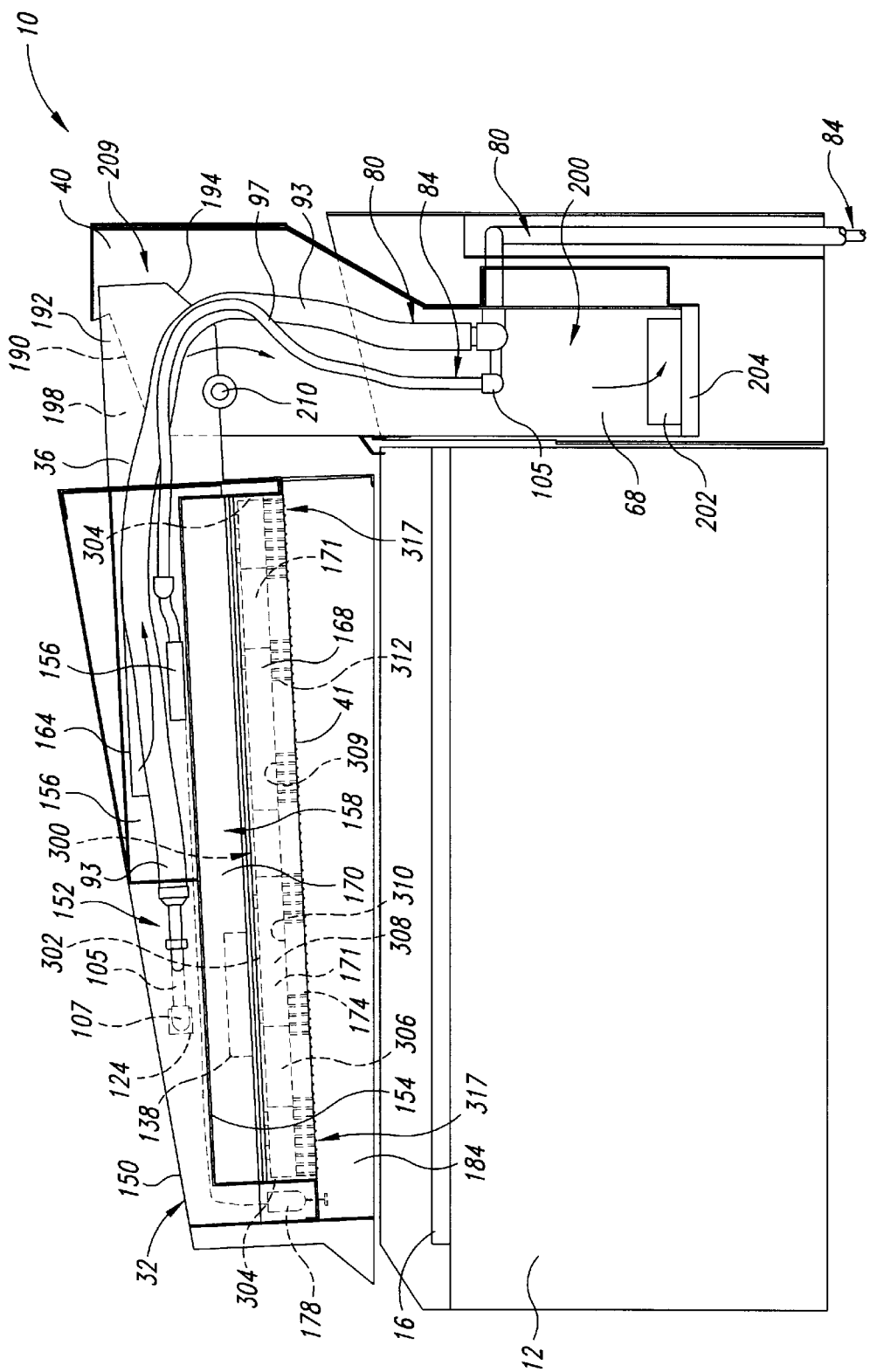
FIG. 5 is an enlarged cross-sectional right side view taken substantially along line 5—5 of FIG. 2 illustrating interior passageways in a broiler, a right stanchion, and a right support arm.

As best seen in FIGS. 4 and 5, the flexible upper hose portion 93 of the gas line 80 extends upwardly from its pass-through fitting 105 through the right stanchion 40. The upper hose portion 93 bends forwardly and extends out of the top of the right stanchion 40 into the right support arm 36. The flexible upper electrical conduit portion 97 of the electrical line 84 extends upwardly from its pass-through fitting 105 through the right stanchion 40 adjacent to the upper hose portion 93. The upper conduit portion 97 also bends forwardly and extends out of the top of the right stanchion 40 into the right support arm 36. Each of the upper hose portion 93 and upper electrical conduit portion 97 are sufficiently flexible to allow it to bend and extend into the right support arm 36 without bending in a radius that is less than the minimum bend radius, thereby ensuring the elastic limit of the upper hose portion and upper electrical conduit portion is not exceeded. Accordingly, fatigue in the upper hose portion 93 and the upper electrical conduit portion 97 is minimized and a constant gas flow through the flexible upper hose portion 93 is maintained without a significant pressure drop in the gas line 80 between the lower fitting 92 and an upper end of the gas line.

The upper hose portion 93 and the upper conduit portion 97 allow the broiler 32 and the left and right support arms 34 and 36 to pivot between the raised, open position and the lowered, cooking position without excessive bending of either the upper hose portion or the upper conduit portion. Accordingly, the need for a sealed swivel joint in the gas line 80, in an area where the right support arm 36 pivots relative to the right stanchion 40 is alleviated.

Figure 6:
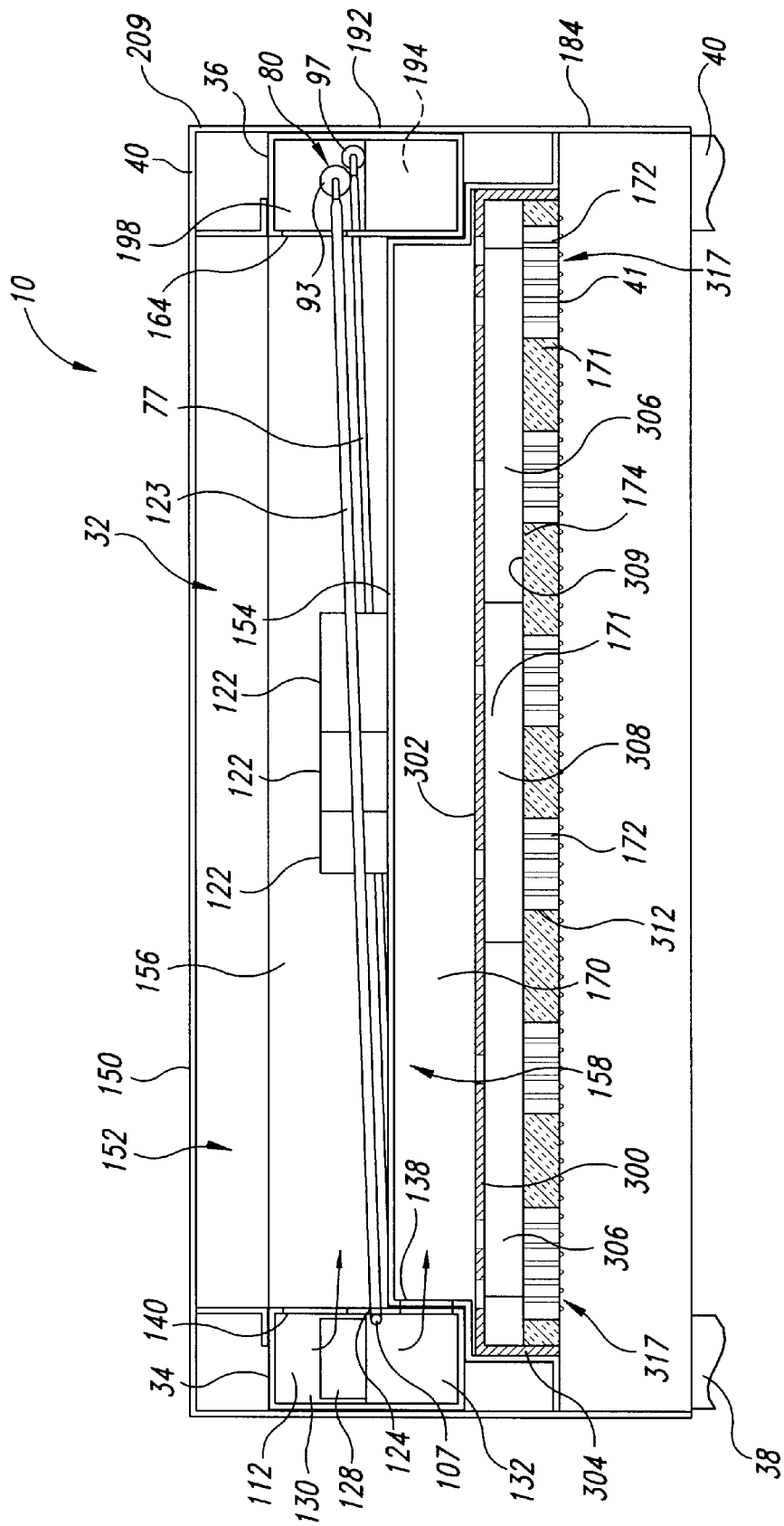
FIG. 6 is an enlarged cross-sectional front view taken substantially along line 6—6 of FIG. 1 illustrating interior air passageways within the broiler and left and right support arms.

As best seen in FIG. 6, the upper conduit portion 97 terminates in the right support arm 36 adjacent to the broiler 32. A plurality of shielded wires 77 of the electrical line 84 extend into the broiler 32 and operatively connects to electrical components 122 contained within the broiler. In the exemplary embodiment, the electrical components 122 include a spark module, a solenoid valve, a tilt switch, and a timer relay. The upper hose portion 93 of the gas line 80 also terminates in the right support arm 36, and upper hose portion is connected to a rigid pipe portion 123 that extends across of the broiler 32 to a left side thereof. The rigid pipe portion 123 terminates at a gas discharge nozzle 107, which extends through a gas inlet orifice 124 in the left support arm 34.

Figure 7:
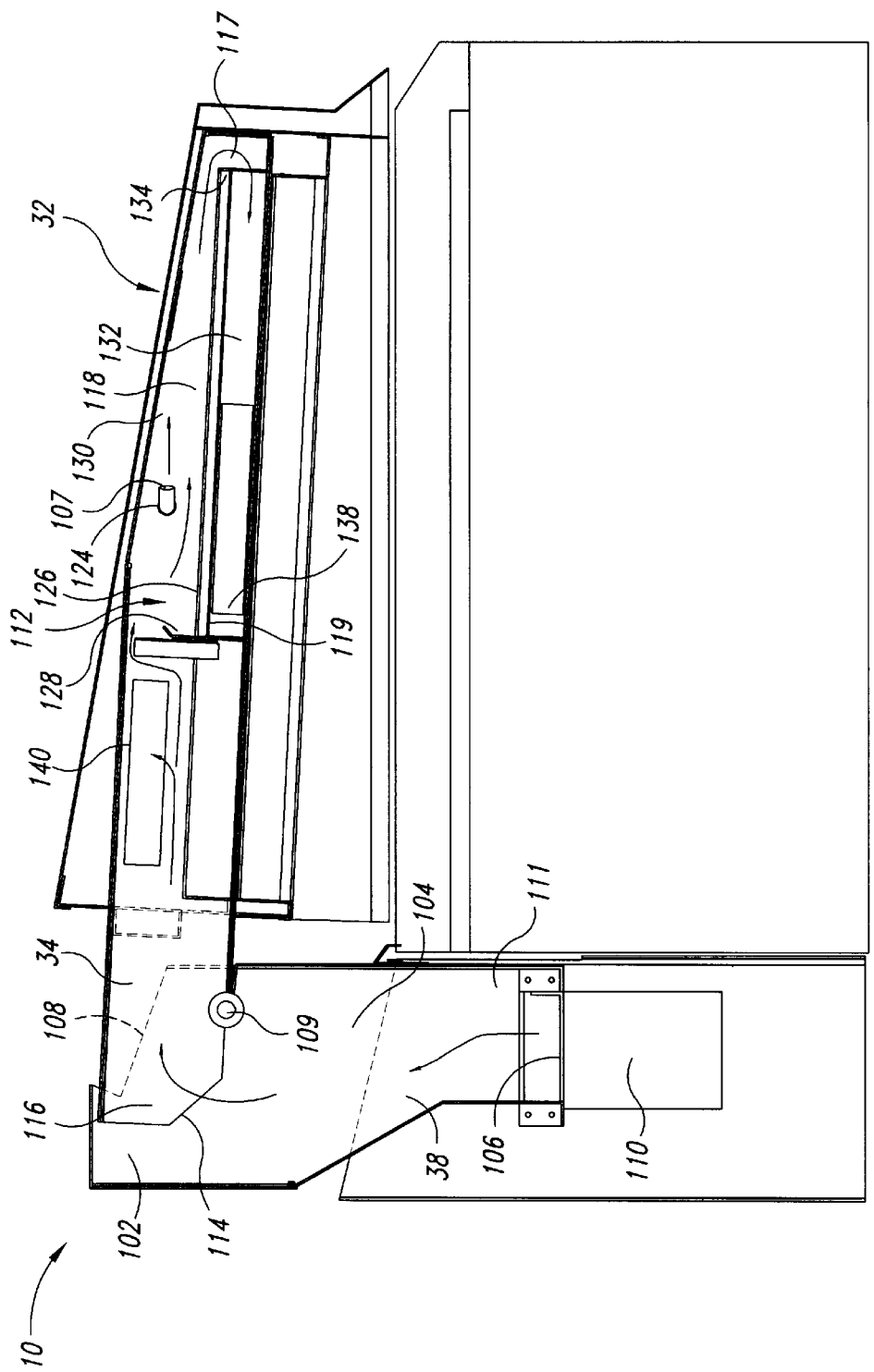
FIG. 7 is an enlarged cross-sectional left side view taken substantially along line 7—7 of FIG. 1 illustrating interior air passageways within a left stanchion and a left support arm.

Before gas from the gas line 80 is delivered to the broiler 32 for ignition, the gas must be mixed with combustion air. As indicated above, the combustion air is provided through the left stanchion 38 and left support arm 34. As best seen in FIG. 7, the left stanchion 38 has an upper portion 102 with an upper air outlet 108 formed therein, and a lower portion 111 with a lower air inlet 106 formed therein. In the exemplary embodiment, the generally hollow left stanchion 38 defines a lower combustion air passageway 104 extending between the lower air inlet 106 and the upper air outlet 108. A blower 110 is securely mounted to the lower portion 111 of the left stanchion 38 and is positioned to blow combustion air into the left stanchion through the lower air inlet 106 and upwardly through the lower air passageway 104 to the upper air outlet 108.

The upper air outlet 108 is shaped and positioned to communicate with an upper combustion air passageway 112 in the generally hollow left support arm 34. The upper air passageway 112 extends forwardly from an upper air inlet 114 in a rear end portion 116 of the left support arm 34 to a forward end portion 118. The upper air inlet 114 communicates with the upper air outlet 108 in the left stanchion 38 such that the combustion air flowing through the lower air passageway 104 by the blower 110 is directed through the upper air inlet and into the upper air passageway 112.

In the exemplary embodiment, the rear end portion 116 of the left support arm 34 extends into and is sealably engaged with the upper portion 102 of the left stanchion 38. The left support arm 34 is pivotally connected to the left stanchion 38 by a left pivot pin 109 that extends through the left stanchion's upper portion 102. The left support arm's rear end portion 116 and the left stanchion's upper portion 102 define a sliding duct hinge that is substantially sealed when the broiler 32 is in the lowered, cooking position and the raised, open position. Accordingly, substantially all of the combustion air from the blower 110 is directed into the left support arm 34 when the broiler 32 is in either the lowered, cooking position or the raised open position.

The left support arm 34 has an air flow divider 126 mounted within the forward end portion 118 of the upper air passageway 112. The air flow divider 126 divides the forward end portion 118 into an upper channel 130 and a lower channel 132, which are interconnected only at a forward end 117 to allow air to flow between the upper and lower channels. The air flow divider 126 of the exemplary embodiment is an aluminum member that is welded in place or otherwise securely fastened within the upper air passageway 112.

An adjustable air metering dam 128 is positioned at a rearward end 119 of the air flow divider 126 adjacent to a rear opening of the upper channel 130. The air metering dam 128 adjustably extends across a selected lower portion of the rear opening of the upper channel 130 to control the volume of combustion air that flows into the upper channel. The air metering dam 128 completely covers and seals a rear end of the lower channel 132. Accordingly, combustion air must first pass over the air metering dam 128, through the upper channel 130, and to the forward end 117 thereof before entering the lower channel 132. Once the combustion air enters the lower channel 132, the air is directed rearwardly toward the sealed rearward end of the lower channel where it is then directed into the broiler 32.

As noted above, the gas discharge nozzle 107 that delivers the gas from the gas source 82 extends through the gas inlet orifice 124 in the left support arm 34. It then extends into the upper channel 130 at a location forward of the air metering dam 128. The gas discharge nozzle 107 directs a selected amount of gas into the flow of combustion air in the upper channel 130 so that the gas and air will mix as they move through the upper and lower channels 130 and 132 to achieve a selected air and gas mixture for the broiler 32. The lower channel 132 of the left support arm 34 has an air and gas mixture outlet 138 at a rearward end of the lower channel that communicates with the broiler 32 such that the gas and air mixture is provided from the mixture outlet into the broiler. Accordingly, the upper and lower channels 130 and 132 in the left support arm 34 act as a mixing chamber for the gas and air before the mixture is directed into the broiler 32 for combustion.

The left support arm 34 includes an upper air outlet 140 that is located rearward of the air metering dam 128 and that communicates with the upper air passageway 112 to cause a portion of the air that enters the upper air passageway to not pass over the air metering dam 128 into the upper channel 130. Instead, this portion of the air is directed into the broiler 32 for cooling the electrical components 122 therein, as will be described below. Accordingly, a portion of the air supplied by the blower 110 through the left stanchion 38 is used for cooling the electrical components 122, and the remaining portion is used for mixing with the gas in the upper and lower channels 130 and 132.

As best seen in FIGS. 5 and 6, the broiler 32 has a broiler housing 150 that is securely attached to the left and right support arms 34 and 36. The broiler housing 150 defines a broiler interior area 152. The broiler 32 has an upper plenum member 154 that forms a divider within the broiler interior area 152 that serves as a metal plate divider wall which is securely attached to the broiler housing 150. The upper plenum member 154 divides the broiler interior area 152 into an upper portion 156 that is above the upper plenum member and a lower portion 158 that is below the upper plenum member. The electrical components 122 of the broiler 32 are mounted in the upper portion 156 of the broiler's interior area 152. In the exemplary embodiment, the upper plenum member 154 completely separates the upper and lower portions 156 and 158 of the broiler interior area 152 such that there is substantially no air flow between the upper and lower portions.

The upper portion 156 of the broiler interior area 152 communicates with the upper air outlet 140 in the left support arm 34 and receives the cooling air portion of the air passing through the upper air passageway 112. The air flowing through the upper portion 156 of the broiler's interior area 152 flows over and around the electrical components 122, thereby carrying heat away from the components and cooling them. The cooling air, having passed by the electrical components 122, is exhausted through an upper exhaust inlet 164 located in the right support arm 36 at the right side of the upper portion 156 of broiler interior area 152. The generally hollow right support arm 36 defines an upper exhaust passageway 198 that extends between the upper exhaust inlet 164 and an upper exhaust outlet 194 in a rear end portion 192 of the right support arm. The upper exhaust passageway 198 is shaped and sized to receive and carry the exhausted cooling air away from the upper portion 156 of the broiler interior area 152. The flexible upper hose portion 93 and the flexible upper conduit portion 97 that extend forwardly from the right stanchion 40, as discussed above, extend through the upper exhaust passageway 198.

As best seen in FIG. 5, the rear end portion 192 of the right support arm 36 sealably extends into the right stanchion 40 through an upper exhaust inlet 190 in an upper portion 209 of the right stanchion. The right support arm 36 is pivotally connected to the right stanchion 40 by a right pivot pin 210 that extends through the right stanchion's upper portion 209, in coaxial alignment with the left pivot pin 109 pivotally connecting the left support arm 34 to the left stanchion 38. The right support arm's rear end portion 192 and the right stanchion's upper portion 209 define a sliding duct hinge that is substantially sealed when the broiler 32 is in the lowered, cooking position and in the raised, open position. In an alternate embodiment, seals are mounted at the interconnection between the left stanchion 38 and left support arm 34, and between the right stanchion 40 and right support arm 36 so each sliding duct hinge remains sealed when the broiler 32 is moved between the lowered, cooking position and the raised, open position.

The generally hollow right stanchion 40 defines a lower exhaust passageway 200 that extends between the upper exhaust inlet 190 and a lower exhaust outlet 202 in the right stanchion's lower portion 68. As best seen in FIGS. 3 and 5, the lower exhaust outlet 202 is located below the position where the gas and electrical lines 80 and 84 enter the right stanchion 40. In the exemplary embodiment, the gas and electrical lines 80 and 84 extend upwardly through the right stanchion 40 along the lower exhaust passageway 200 such that the lower exhaust passageway also serves as the gas hose and electrical conduit raceway.

As best seen in FIG. 2, the lower exhaust outlet 202 (shown in hidden lines) directs the exhausted cooling air inwardly into the housing interior area 50 toward the left stanchion 38. A lower component tray 204 (see FIG. 2) extends between the left and right stanchions 38 and 40, and a plurality of lower electrical components 206, shown in hidden lines, are mounted on the lower component tray substantially adjacent to the lower exhaust outlet 202. The lower electrical components 206 include a conventional transformer and a blower air switch. The exhausted cooling air passing from the lower exhaust outlet 202 is directed over and around the lower electrical components 206 to cool the lower electrical components 206 during operation of the broiler assembly 10.

Returning now to the broiler 32 illustrated in FIGS. 5 and 6, the broiler has a burner tile holder 300 positioned in the lower portion 158 of the broiler interior area 152. The burner tile holder 300 defines a lower plenum member that is spaced apart from and below the upper plenum member 154 and is securely attached to the broiler housing 150 to define a plenum 170 between the upper and lower plenum members. The plenum 170 communicates with the upper mixture outlet 138 of the lower channel 132 in the left support arm 34 such that the air and gas mixture from the lower channel flows into the plenum. The flow of the air and gas mixture is such that the mixture in the plenum 170 is at a selected substantially constant pressure.

Figure 9:
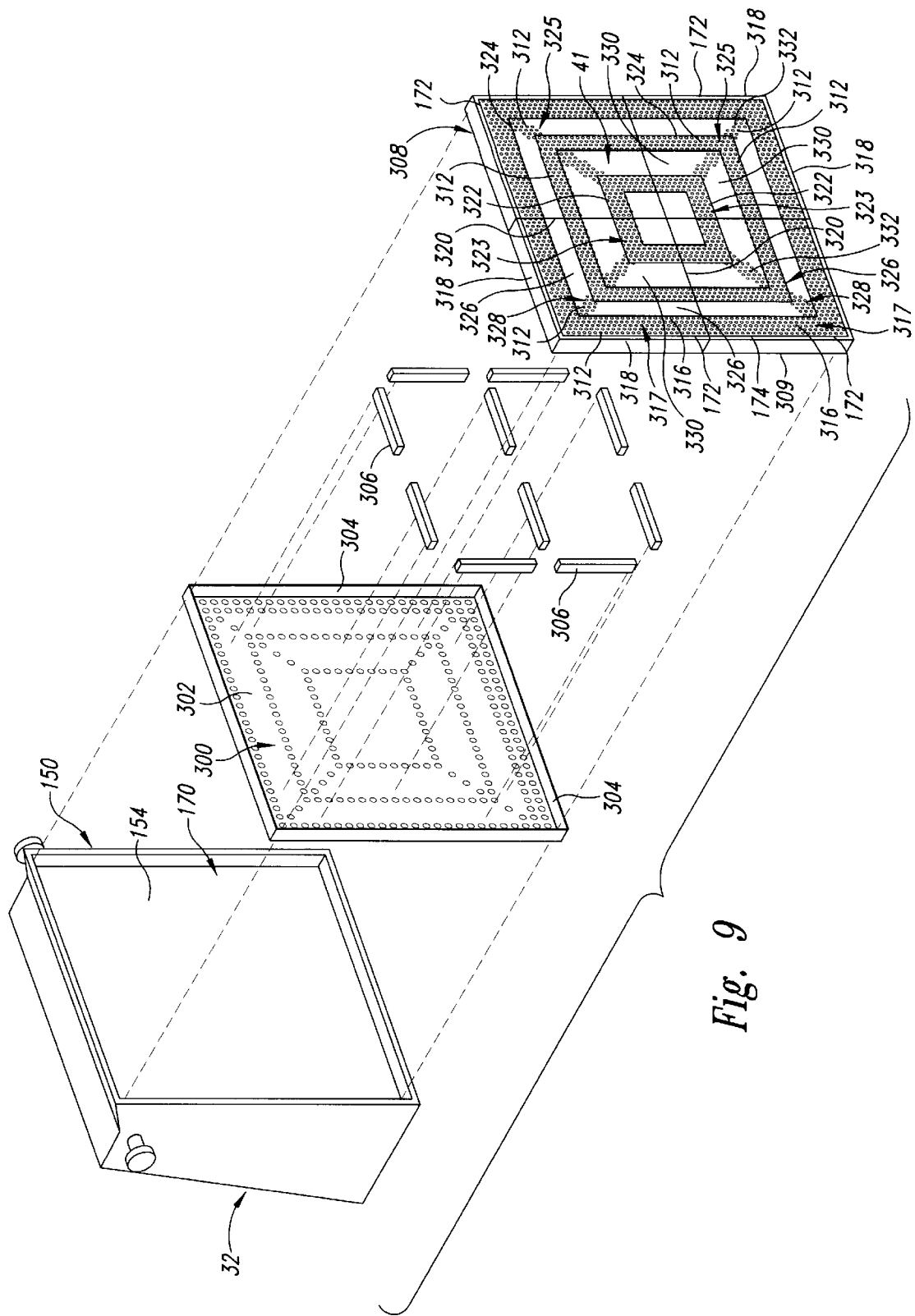
FIG. 9 is an enlarged exploded isometric view of a burner tile holder, burner tiles, and bridging members shown removed from a broiler housing of FIG. 1.

In the exemplary embodiment best shown in FIG. 9, the burner tile holder 300 is an inverted, pan-like structure defined by a distributor plate 302 and four sidewalls 304 extending around the distributor plate and projecting away from the distribution plate. The sidewalls 304 are fastened to the broiler housing 150 to retain the burner tile holder 300 in the broiler housing's broiler interior area 152 spaced apart from the upper plenum member 154.

The burner tile holder 300 securely holds four burner tiles 172 in a selected orientation and pattern to define the broiling surface 41. The burner tiles 172 of the exemplary embodiment are ceramic square tiles that are spaced apart from the distributor plate 302 by a plurality of bridging members 306 that interconnect the burner tiles to the burner tile holder. The burner tiles 172 and bridging members 306 are secured to the burner tile holder 300 by conventional fasteners or the like such that a gas distribution space 308 is formed between the distributor plate 302 and the burner tiles.

The burner tiles 172 have an upper surface 309 that faces the gas distributor plate 302 and a lower surface 174 facing away from the gas distribution plate. The lower surface 174 defines the broiling surface 41, which is spaced above the cooking surface 16 of the griddle 12 (FIG. 5) when the broiler 32 is in the lowered, cooking position, so as to provide even and controlled broiling heat.

The distributor plate 302 has a plurality of apertures 171 extending therethrough that communicate with the plenum 170 and with the gas distribution space 308 at locations above the burner tiles 172 to evenly distribute the gas and air mixture from the plenum to all of the burner tiles. The burner tiles 172 also have burner apertures 312 extending therethrough that allow the gas and air mixture to pass from the gas distribution space 308 to the broiler surface 41. After the gas and air mixture has passed through the burner tiles 172, the mixture is ignited by a conventional spark module electrode assembly 178 that is mounted at a forward portion of the broiler interior area 152 adjacent to the forward edge of the lower plenum member 168. Accordingly, the ignited mixture of gas and air provides the broiling heat.

In the exemplary embodiment, the four square ceramic burner tiles 172 are arranged to define a substantially square broiler surface 41. The preferred ceramic material has advantageous insulative characteristics that minimizes thermal stresses and heat transfer within the burner housing 150, so the temperature of the upper surface 309 of the burner tiles that face the distribution plate 302 and the plenum 170 does not get too high.

Figure 10:
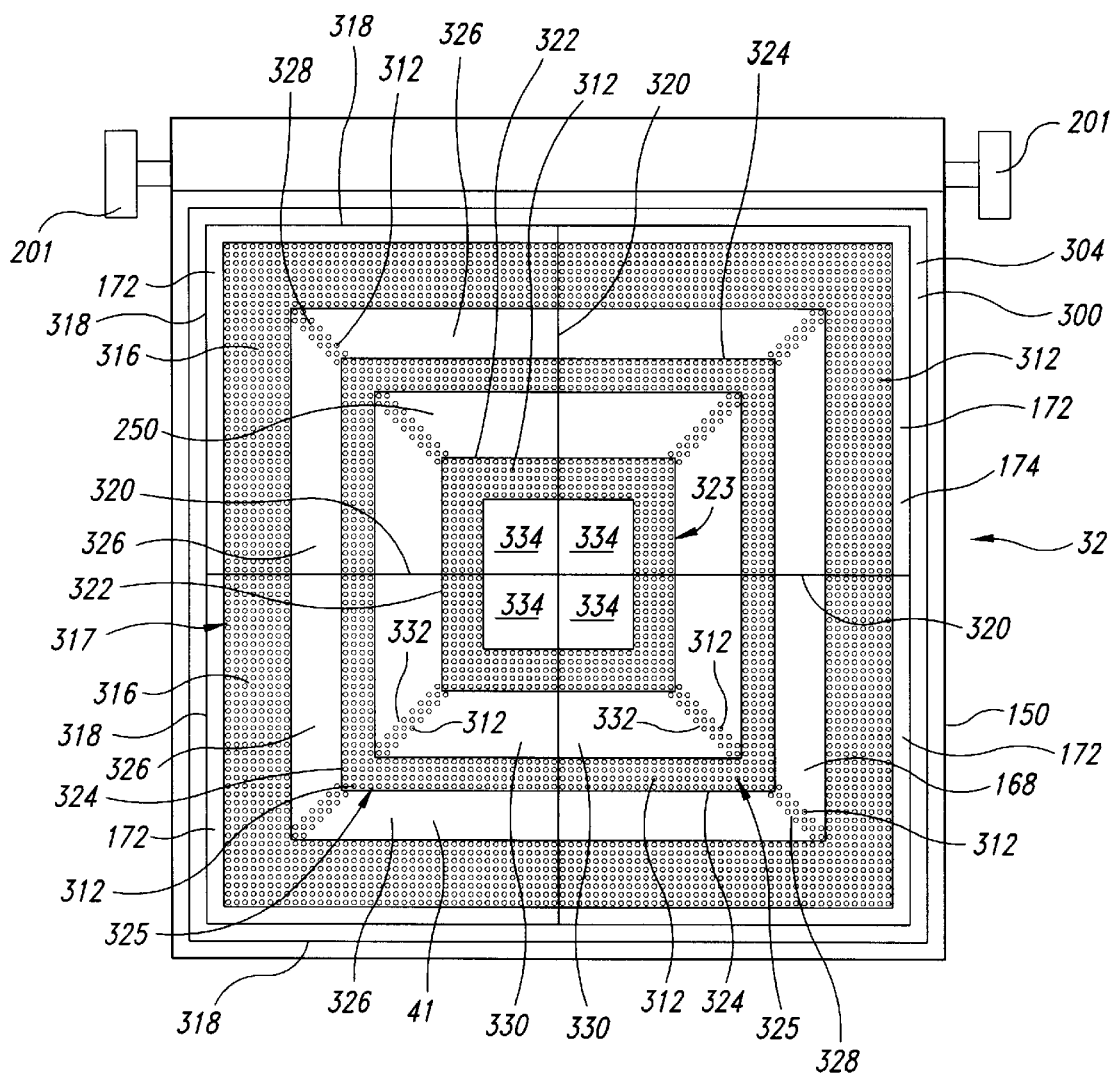
FIG. 10 is an enlarged bottom plan view of the broiler of FIG. 9 showing a burner tile pattern.

As best seen in FIGS. 9 and 10, the four burner tiles 172 have the burner apertures 312 arranged in a selected pattern to provide uniform heat distribution over the broiler surface 41 during operation of the broiler 32. Each burner tile 172 is oriented in the burner tile holder 300 such that two outer tile sides 318 of the burner tile are adjacent to the burner tile holder's sidewalls 304 and two inner tile sides 320 extend inwardly away from the sidewalls. Accordingly, each inner tile side 320 of each burner tile 172 is immediately adjacent to an inner tile side of an adjacent burner tile.

Each burner tile 172 has an L-shaped outer portion 316 generally adjacent to the two outer tile sides 318, and the outer position terminates at opposite ends at the two inner tile sides 320. The outer portion 316 includes a plurality of the burner apertures 312 extending therethrough to define an outer set 317 of burner apertures arranged between the inner tile sides 320. Each burner tile also has an L-shaped inner portion 322 that is spaced inwardly apart from the outer portion 316 and that terminates at opposite ends at the two inner tile sides 320. The inner portion 322 also has a plurality of burner apertures 312 extending therethrough to define an L-shaped inner set 323 of burner apertures arranged between the inner tile sides 320. Each burner tile 172 in the exemplary embodiment, also has an L-shaped middle portion 324 positioned between the inner and outer portions 322 and 316, and the middle portion terminates at the two inner tile sides 320. The L-shaped middle portion 324 includes a plurality of burner apertures 312 extending therethrough to define an L-shaped middle set 325 of burner apertures arranged between the inner tile sides 320.

Each burner tile's outer and middle portions 316 and 324 are separated by a pair of first spacer portions 326 having no burner apertures extending therethrough. The pair of first spacer portions 326 are perpendicular to each other and are separated by a plurality of burner apertures 312 defining a first ignition path 328 extending between the burner tile outer portion 316 and middle portion 324. The burner apertures 312 defining the first ignition path 328 allows the gas to flow therethrough during operation of the broiler assembly 10. Accordingly, the first ignition path 328 provides a pathway along which a flame that ignites the gas can travel between the outer portion 316 and the middle portion 324. Accordingly, lighting the gas passing through burner 312 apertures in the outer portion 316 will result in a flame traveling from the outer portion, along the first ignition path 328 to the middle portion 324, thereby lighting the gas passing through the burner apertures 312 in the middle portion. Since the first spacer portions 326 have no burner apertures 312 therein, no flames are present at the first spacer portions during operation of the broiler 32.

Each burner tile's middle and inner portions 324 and 322 are separated by a pair of second spacer portions 330 having no burner apertures extending therethrough. The pair of second spacer portions 330 are perpendicular to each other and are separated by a plurality of burner apertures 312 defining a second ignition pathway 332 extending between the burner tile inner portion 322 and the middle portion 324. Accordingly, ignition of the gas flowing through the burner apertures 312 in the middle portion 322 will result in a flame traveling along the second ignition pathway 332 to the inner portion 322 so as to ignite the gas passing through the burner apertures 312 therein. Since the second spacer portions 330 have no burner apertures 312 therein, no flames are present at those spacer portions during operation of the broiler 32.

An inner corner 334 of each burner tile 172 that is adjacent to the three other burner tiles defines a central portion 336 of the broiler surface 41 having no burner apertures therein. Accordingly, the gas passing through the burner apertures 312 in each burner tile 172 will be ignited only along the inner, middle, and outer portions 322, 324, and 316, respectively, and along the first and second ignition pathways 328 and 332.

When the burner tiles 172 are installed on the burner tile holder 300, the tiles are oriented with the ends of the L-shaped outer portion 316 of each burner tile communicating with the ends of the L-shaped outer portion of the two adjacent burner tiles, so the four burner tiles define a substantially square outer set 317 of burner apertures 312 around the broiler surface 41. The ends of each burner tile's L-shaped middle portion 324 communicates with the ends of the L-shaped middle portions of the two adjacent burner tiles 172 so the four burner tiles 172 also define a substantially square middle set 325 of burner apertures 312. The outer and middle sets 317 and 325 of burner apertures 312 are separated by the first spacer portions 326 having no burner apertures therein. The ends of the burner tile's L-shaped inner portions 322 communicate with the ends of the L-shaped inner portions of the two adjacent burner tiles so the four burner tiles 172 further define a substantially square inner set 323 of burner apertures 312. The inner and middle sets 323 and 325 of burner aperture 312 are separated by the second spacer portions 330 having no burner apertures therein. The first ignition pathways 328 extend between the substantially outer and middle sets 317 and 325 of burner apertures 312, and the second ignition pathways 332 extend between the middle and inner sets 325 and 327 of burner apertures.

In the exemplary embodiment, the burner apertures 312 in the inner, middle, and outer portions 322, 324, and 316, respectively, provide the burner pattern having concentrically arranged substantially square burner areas with the first and second ignition pathways 328 and 332 extending therebetween. In one exemplary embodiment, the outer set 317 of burner apertures 312 defines an approximately 19.6 inch square pattern that extends approximately 2 inches toward the middle set 325 of burner apertures. The first spacer portions 326 separating the outer and middle sets 317 and 325 of burner apertures 312 substantially define an approximately 15.6 inch square pattern that extends approximately 1.5 inches toward the middle set of burner apertures.

The middle set 325 of burner apertures 312 define an approximately 12.6 inch square pattern that extends approximately 1 inch toward the inner set 327 of burner apertures. The second spacer portions 330 separating the middle and inner sets 325 and 327 of burner apertures 312 substantially define an approximately 10.6 inch square pattern that extends approximately 2 inches toward the inner set 327 of burner apertures. The inner set 327 of burner apertures 312 defines an approximately 6.6 inch square pattern that extends approximately 1.25 inches away from the adjacent second spacer portions 330.

The configuration of concentric squares of burner apertures 312 is such that the burner tiles 172 have a substantially non-uniform heat source across the burner surface 41, but the heat generated from the concentric squares sum together across the burner surface 41 to provide a substantially flat heat profile in the X and Y directions. Accordingly, the heat pattern from the broiler surface 41 provides a substantially uniform heat distribution at a cooking surface spaced a selected distance apart from the broiler surface for even cooking heat during operation of the broiler assembly 10 without heat spikes or hot spots that could cause uneven heating or cooking.

Although the illustrated embodiment has the concentrically arranged, square inner middle and outer sets 323, 325, and 317 of burner apertures 312, other patterns of burner aperture 312 are provided in alternate embodiments (not illustrated) so long as they provide a concentrically arranged heat radiation sources to provide the desired even heat distribution pattern at the cooking surface spaced apart from the broiler surface 41.

Figure 11:
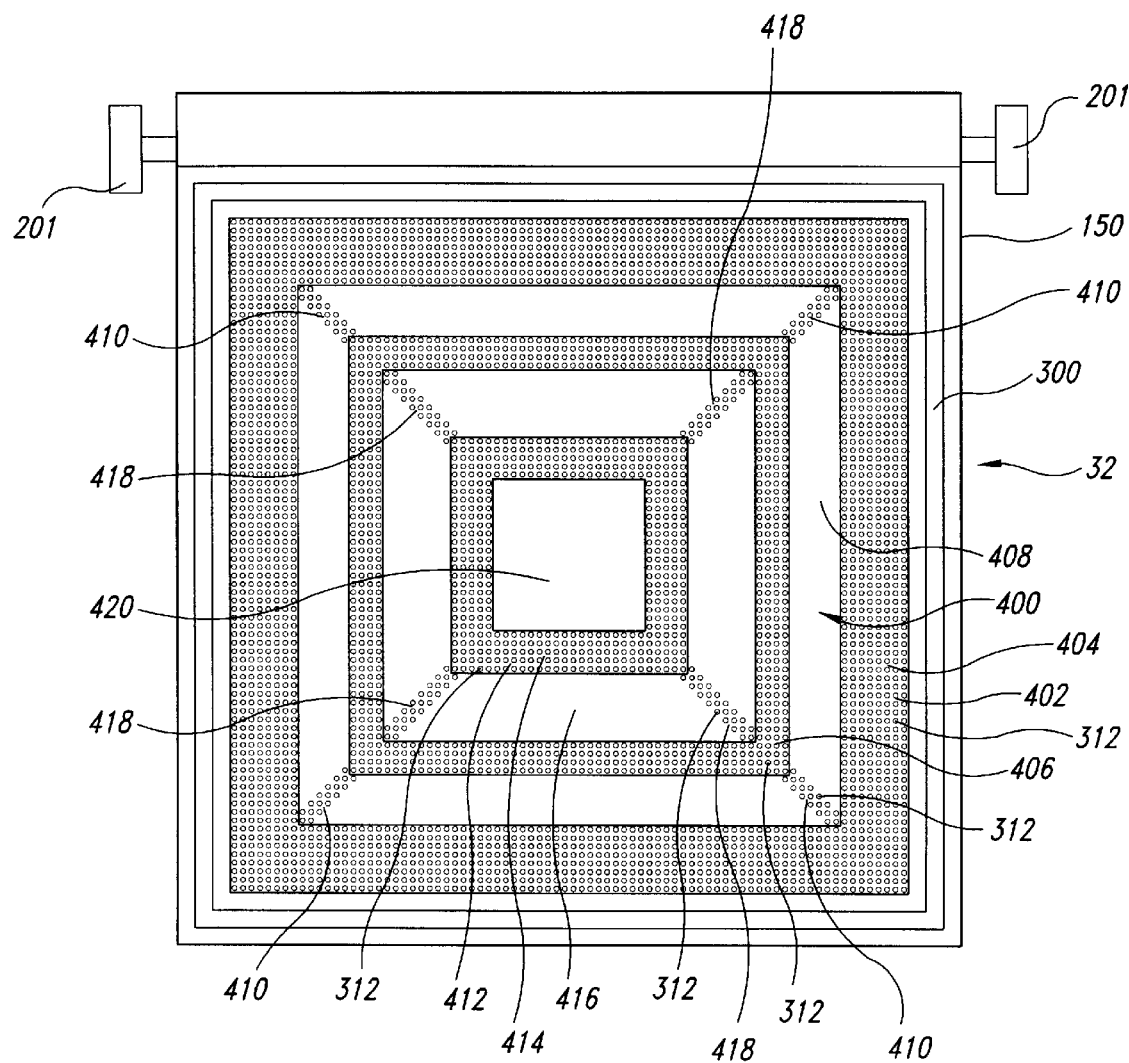
FIG. 11 is an alternate embodiment showing a bottom plan view of the broiler and a single burner tile mounted in the broiler.

As best seen in FIG. 11, an alternate embodiment of the broiler assembly 10 has a single broiler tile 400, such as a ceramic, square broiler tile attached to the broiler tile holder 300. The single broiler tile 400 includes an outer set 402 of burner apertures 312 extending through an outer portion 404 of the broiler tile. The outer set 402 is arranged in a substantially square configuration, and is spaced apart from a substantially square middle set 406 of burner apertures 312 by outer spacer portions 408 having no burner apertures therein. The outer spacer portions 408 are separated from each other by first ignition paths 410 extending between corners of the outer and middle sets 402 and 406 of burner apertures 312.

The single broiler tile 400 also includes a substantially square inner set 412 of burner apertures 312 extending through an inner portion 414 of the broiler tile. The inner set 414 of burner apertures 312 is spaced inwardly apart from the middle set 406 of burner apertures by inner spacer portions 416 having no burner apertures therein. The inner spacer portions 416 are separated from each other by second ignition paths 418 extending between corners of the middle and inner sets 406 and 414 of burner apertures 312.

The inner set 412 of burner apertures 312 extend around a central portion 420 of the burner tile 400, and the central portion has no burner apertures extending therethrough. Accordingly, inner, middle, and outer sets 412, 406, and 402 of burner apertures 312 are spaced apart from each other and concentrically disposed about the burner tiles central portion 420 so as to provide an even heat pattern at the cooking surface spaced apart from the broiler surface 41.

In other alternate embodiments (not shown), the broiler assembly 10 has a heat-generating member, such as a selected metal or ceramic mesh, rather than burner tiles. In one alternate embodiment, the broiler is a gas broiler, and in another alternate embodiment the broiler is an electric broiler. The heat-generating member is to provide heat radiating zones spaced apart by spacer zones that provide no heat or heat of lesser intensity, so as to provide the non-uniform heat source that provides the uniformly distributed heat pattern.

As best seen in FIG. 5, the broiler housing 150 of the exemplary embodiment has outer edge portions 184 that extend downwardly past the broiler tile holder 300. The outer edge portions 184 provide outer guard portions that direct the heat from the broiler surface 41 downwardly toward the griddle cooking surface 16 when the broiler 32 is in the lowered, cooking position. As best seen in FIG. 1, the front of the broiler 32 also has a pair of handles 201 on opposite sides of the broiler housing 150. The handles 201 are positioned so they remain cool and usable while the broiler 32 is in use, thereby allowing a user to pivot the broiler between the lowered, cooking position and the raised, open position, and to move the broiler laterally.

Referring again to FIG. 5, the burner tile holder 300 is mounted to the broiler housing 150 at an angle so that the broiler surface 41 slopes upwardly and rearwardly when the broiler 32 is in the lowered, cooking position. The sloped broiler surface 41 is positioned to direct broiler combustion exhaust and cooking fumes, which are generated below the broiler surface, rearwardly toward the area between the left and right stanchions 34 and 36.

Figure 8:
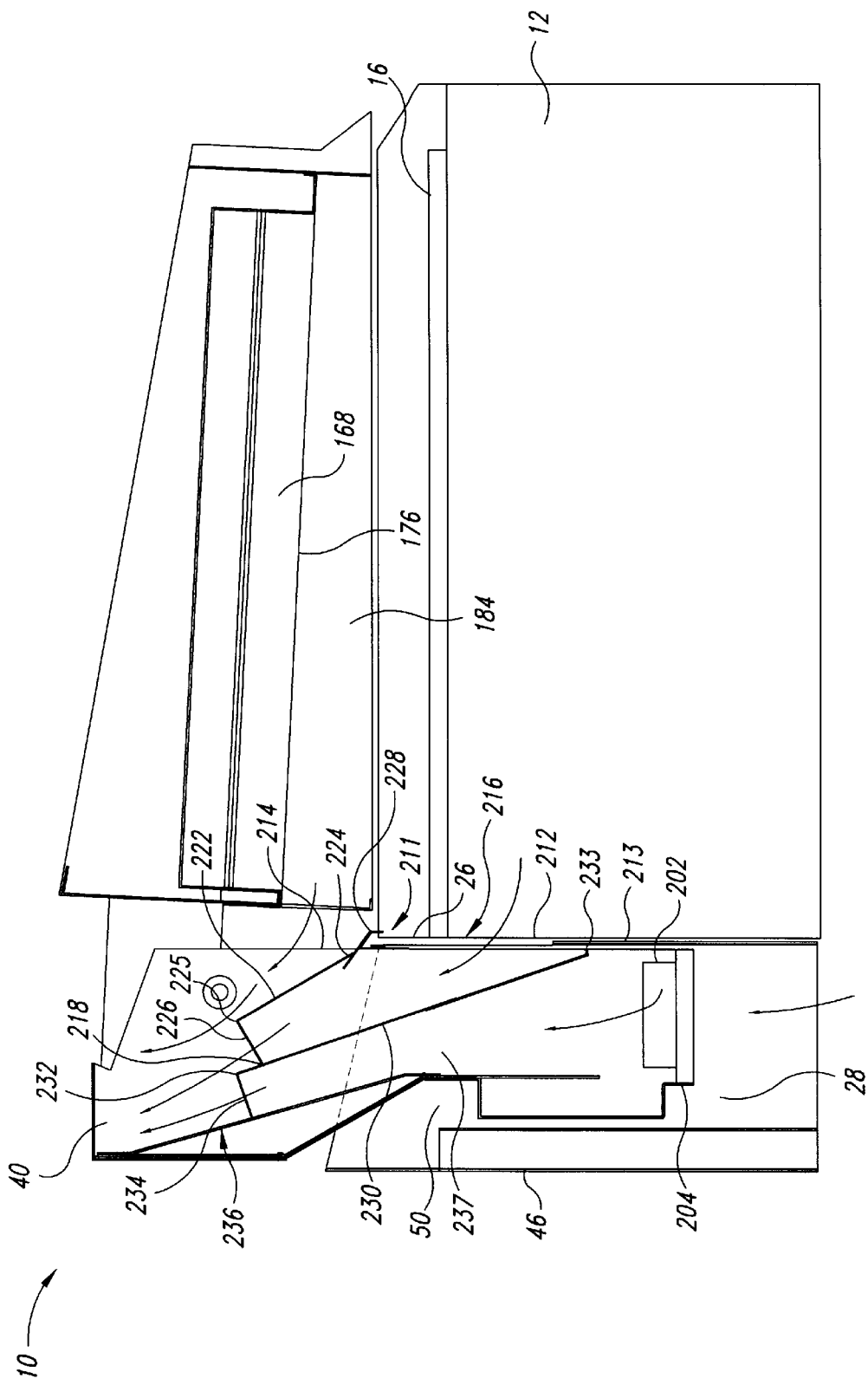
FIG. 8 is an enlarged cross-sectional left side view taken substantially along line 8—8 of FIG. 1 illustrating an exhaust flue system and exhaust and air passageways, without the components of the rail system and broiler being shown for purposes of clarity.

As best seen in FIG. 8, the conventional griddle 12 has the cooking surface 16 above a griddle exhaust aperture 212 in a rear wall 213 of the griddle. The griddle exhaust aperture 212 is positioned and sized to receive griddle exhaust generated from the heating of the griddle's cooking surface. The griddle exhaust aperture 212 directs the griddle exhaust rearwardly away from the griddle 12 toward the housing interior area 50 of the rear housing 28 when the broiler assembly 10 is mounted to the griddle. When the broiler 32 is activated in the lowered, cooking position, the broiler exhaust is generated between the broiler surface 41 and the griddle's cooking surface 16. During a cooking procedure with the broiler 32 and the griddle 12 being activated, the broiler exhaust and the griddle exhaust have temperatures in the range of 800°–1200° F.

The broiler assembly 10 controls the flow of high temperature griddle and broiler exhausts with a flue system 218 mounted within a cooker exhaust receiving area 211 (see FIG. 2) within the rear housing between the left and right stanchions 38 and 40. The flue system 218 is attached to and moves with the left and right stanchions 38 and 40 as the broiler 32 is moved laterally. The flue system 218 is adapted to direct the broiler exhaust, the griddle exhaust, and also the exhausted cooling air exiting the right stanchion 40 upwardly away from broiler assembly 10, for example toward a conventional fan or hood that is typically placed above a griddle. The flue system 218 is adapted to effectively channel exhaust gases upwardly away from the broiler assembly 10 regardless of the lateral position of the broiler 32 relative to the griddle 12.

As shown in FIG. 8, the flue system 218 includes a broiler flue 222 formed by a generally flat metal plate having a forward lower edge 224 adjacent to the rear splash guard 26 of the griddle 12. The forward lower edge 224 is positioned above and rearward of the griddle's rear splash guard 26 when the broiler conversion assembly 10 is mounted to the griddle 12. The broiler flue 222 is sloped upwardly and rearwardly from the forward, lower edge 224 to a rearward, upper edge 225. Support brackets 226 are connected to the broiler flue's rearward upper edge 225, to securely attach the broiler flue 222 to the left and right stanchions 38 and 40.

A drip guard 228 is positioned below the forward lower edge 224 of the broiler flue 222 such that the broiler flue slightly overlaps the drip guard. The drip guard 228 slopes downwardly and forwardly, and extends over the rear splash guard 26 of the griddle 12. The drip guard 228 and the broiler flue 222 extend laterally across the cooker exhaust opening 211 and divide the cooker exhaust receiving area into an upper broiler exhaust receiving passageway 214 and a lower griddle exhaust receiving passageway 216 below the upper broiler exhaust receiving passageway and aligned with the griddle exhaust aperture 212 to receive exhaust therefrom.

The upper broiler and lower griddle exhaust receiving passageways 214 and 216 are defined on the left and right by the left and right stanchions 38 and 40. The upper broiler exhaust receiving passageway 214 is further defined by a rear surface of the broiler 32. The broiler flue 222 and the drip guard 228 are shaped and positioned to direct the broiler exhaust upwardly and rearwardly through the upper broiler exhaust receiving passageway 214 in a layer of broiler exhaust relative to the rear housing 28. The drip guard 228 is also positioned to direct any condensation or drippings from the broiler flue 222 onto the griddle's cooking surface 16.

A griddle flue 230 is spaced below and rearward from the broiler flue 222 and defines a lower side of the lower griddle exhaust receiving passageway 216. The griddle flue 230 is a flat metal plate sloped upwardly and rearwardly from a forward, lower edge 233 adjacent to and below the griddle exhaust aperture 212. The griddle flue 230 terminates at a rearward, upper edge 232 that is spaced apart from the broiler flue's rearward upper edge 225 to define a top opening of the griddle exhaust receiving passageway 216. The griddle flue 230 is securely mounted to the left and right stanchions 38 and 40 by support brackets 234. The griddle flue 230 is shaped and sized to direct the griddle exhaust from the griddle exhaust aperture 212 through the lower griddle exhaust receiving passageway 216 and out the top opening upwardly and rearwardly in a layer of griddle exhaust, such that the layer of griddle exhaust is rearwardly adjacent to the high temperature layer of broiler exhaust. The top opening of the griddle exhaust receiving passageway 216 is shaped to maintain a substantially laminar flow of the griddle exhaust when it exits the griddle exhaust receiving passageway.

The flue system 218 also includes a back flue 236 spaced rearwardly apart from the griddle flue 230. The back flue 236 slopes rearwardly and upwardly from a position forwardly adjacent to the top of the hose-and-conduit housing 88 to the upper, rearward corner of the left and right stanchions 38 and 40. Accordingly, the back flue 236 defines an exhausted cooling air passageway 237 between the griddle flue 230 and the back flue 236 that communicates with the lower exhaust outlet 202 in the right stanchion 40. The flow of exhausted cooling air exiting the right stanchion 40 as discussed above first cools the lower electrical components 206 in the housing interior area 50 and then is directed into the exhaust air passageway 237. The exhausted cooling air moves upwardly through a top opening of the exhausted cooling air passageway 237 between the griddle flue 230 and the back flue 236. The top opening of the exhausted cooling air passageway 237 is shaped to maintain a substantially laminar flow of the exhausted cooling air when it exits the exhausted cooling air passageway.

The exhausted cooling air is directed upwardly along the back flue 236 forming a barrier layer of wash air between the back flue 236 and the layer of griddle exhaust from the lower griddle exhaust receiving passageway 216. The barrier layer of wash air has a significantly lower temperature than the layer of griddle exhaust, and is located between the higher temperature layer of griddle exhaust and the back flue 236 to provide an insulating layer of air between the higher temperature layers of griddle exhaust and broiler exhaust. As a result, the back flue 236 remains relatively cool during operation of the broiler 32 and the griddle 12.

The back flue 236 is positioned apart from and forward of the rear wall 46 of the rear housing 28 by a selected distance, thereby forming a double-walled structure at the rear of the broiler assembly 10 with an air gap therebetween. As a result, the rear wall 46 of the rear housing 28 is effectively insulated from the high temperature broiler and griddle exhausts, and the rear wall remains cool to the touch while the broiler 32 and the griddle are cooking. When the broiler assembly 10 is mounted onto the griddle 12 or other single-sided cooking apparatus, the entire combination can be positioned in a room with the rear wall 46 of the rear housing 28 immediately against or adjacent to a wall of the room with danger of fire. With such zero-clearance placement possible, the broiler assembly 10 sized to be attached to a conventional griddle, charbroiler, or other cooker can be located within the existing space previously required for the conventional cooker and the space behind the cooker required for clearance from the wall. Accordingly, the broiler assembly 10 does not require additional space to be installed safely on a conventional cooker.

Numerous modifications and variations of the broiler assembly disclosed herein will occur to those skilled in the art in view of this disclosure. Therefore, it is to be understood that such modifications and variations may be practiced while remaining within the spirit and the scope of the invention as defined in the following claims.

We claim:

1. A broiler assembly connectable to a cooking apparatus, comprising:
    a broiler housing;
    a burner portion connected to the broiler housing, the burner portion defining a broiler surface and having first and second heating portions that generate a selected cooking heat from the broiler surface, the first and second heating portions being spaced apart from each other by an intermediate portion to define a substantially non-uniform heat source across the broiler surface and the first and second heating portions being positioned to provide a substantially even heat distribution at a selected distance spaced apart from the broiler surface upon activation of the burner portion.

2. The broiler assembly of claim 1 wherein the intermediate portion between the first and second heating portions generates substantially no heat upon activation of the burner portion.

3. The broiler assembly of claim 1 wherein the burner portion includes a plurality of burner tiles.

4. The broiler assembly of claim 1 wherein the broiler assembly is connectable to a gas source, and further includes a plenum member defining a plenum in the broiler interior, the plenum being connected to the gas source and adapted to receive gas from the gas source, the first and second heating portions having a plurality of burner apertures extending therethrough and communicating with the plenum to channel the combustion gas from the plenum to the broiler surface for combustion.

5. The broiler assembly of claim 1 wherein the first heating portion is concentrically disposed about the second heating portion with the intermediate portion disposed therebetween.

6. The broiler assembly of claim 1 wherein the first and second heating portions are substantially coplanar.

7. The broiler assembly of claim 4 wherein the burner portion includes a ceramic burner tile with the burner apertures extending therethrough.

8. The broiler assembly of claim 4 wherein the plenum member includes a burner tile holder having a distributor plate portion with a plurality of distributor apertures therein that communicate with the plenum.

9. The broiler assembly of claim 4 wherein the plenum member includes a burner tile holder having a distributor plate with a plurality of distributor apertures therein that communicate with the plenum, and bridge members connect the burner portion to the distributor plate with the burner portion being spaced apart from the distributor plate by a selected distance.

10. The broiler assembly of claim 4 wherein each of the first and second sets of burner apertures is arranged in a generally square configuration with the first set of burner apertures being concentrically disposed about the second set of burner apertures.

11. The broiler assembly of claim 4 wherein the burner portion has a plurality of ignition burner apertures extending between the first and second heating portions and adjacent to the intermediate portion to define an ignition path between the first and second heating portions.

12. The broiler assembly of claim 4 wherein the first heating portion of the burner portion is an outer portion and the second heating portion of the burner portion is an inner portion, and the burner portion further has a middle portion positioned between the inner and outer portions, the intermediate portion being a first intermediate portion with no apertures therein positioned between the middle portion and the inner portion to space the middle and inner portions apart from each other, the burner portion having a second intermediate portion with no apertures therein positioned between the middle and outer portions to space the middle and outer portions apart from each other.

13. The broiler assembly of claim 12 wherein the inner, middle and outer portions with the burner apertures therein are concentrically disposed about a central portion of the burner portion having no apertures therein.

14. The broiler assembly of claim 12 wherein the burner portion has a set of first ignition burner apertures extending between the inner and middle portions and defining a first ignition path therebetween adjacent to the first intermediate portion and the burner portion has a second set of ignition burner apertures extending between the middle and outer portions adjacent to the second intermediate portion, the second set of ignition burner apertures defining a second ignition path extending between the middle and outer portions.

15. The broiler assembly of claim 1 wherein the first heating portion of the burner portion is an outer portion and the second heating portion of the burner portion is an inner portion.

* * * * *